UNITED STATES PATENT OFFICE.

RALPH H. McKEE, OF RIDGEFIELD PARK, NEW JERSEY.

PROCESS OF TREATING WASTE SULFITE-CELLULOSE LIQUORS.

1,284,739. Specification of Letters Patent. Patented Nov. 12, 1918.

No Drawing. Application filed June 22, 1917. Serial No. 176,406.

*To all whom it may concern:*

Be it known that I, RALPH H. McKEE, a citizen of the United States, residing at Ridgefield Park, in the county of Bergen and State of New Jersey, have invented certain new and useful Improvements in Processes of Treating Waste Sulfite-Cellulose Liquors, of which the following is a specification.

This invention relates to processes of treating waste sulfite-cellulose liquors preparatory to the production and recovery of ethyl alcohol.

It is well known that such waste liquors contain fermentable sugars in quantities which are large in the aggregate, although constituting a relatively small percentage of the total amount of sulfite liquor; and many attempts have heretofore been made to utilize such sugars as a commercial source of ethyl alcohol. In all such attempts, so far as I am aware, difficulties have been encountered in securing a free and strong fermentation of the sugars, owing partly at least to the presence in the liquor of certain sulfur compounds which act as anti-ferments. Among these are included free sulfurous acid, and sulfites of calcium and magnesium. According to the present invention, these objectionable sulfur compounds are substantially eliminated, with the result that a rapid fermentation and good yields of alcohol are obtained. This result is secured by a process which includes the conjoint action upon the liquor of a soluble barium salt such as barium carbonate or barium sulfid, and atmospheric air, or equivalent oxidizing agent, under such conditions that the objectionable sulfur compounds are eliminated in the form of barium sulfate.

I prefer to proceed as follows, it being understood however that my invention is not limited to the precise operating conditions and manipulative details which are herein fully disclosed as constituting the preferred embodiment of my process:—

(1) The uncombined sulfurous acid is first eliminated as completely as practicable by blowing the liquor with steam or air, or with steam and air conjointly, the escaping sulfur dioxid being preferably led to the acid towers of the sulfite mill and there used for the preparation of fresh cooking liquor. The process is operative however even though this preliminary step be omitted, since soluble barium compounds under the conditions described below are effective to remove free sulfurous acid; but the expulsion of the uncombined acid economizes both the acid and the barium compound which would otherwise be required for its removal.

(2) The blown liquor, preferably at about 80° C., is stirred with air and a soluble barium compound, preferably barium carbonate or barium sulfid, is added in proportions slightly in excess of the amount required to combine with the soluble sulfites in the liquor. For example, barium carbonate may be added in the form of the precipitated salt prepared as described below, or as the mineral witherite, or as an impure barium carbonate made by the partial or complete carbonatation of the so-called "black ash" formed at a later operating stage. With moderate but thorough stirring by injected air the reaction is complete at 80° C. in two to three hours. The precipitate consists essentially of barium sulfate, with small proportions of the carbonates of calcium and magnesium, and with a small percentage of unchanged barium carbonate according to the excess used. Barium sulfite is absent, or at the most occurs in traces in the solution or the precipitate. An oxidizing effect is essential to this reaction, and while other oxidizing agents might be used, the employment of atmospheric oxygen is most convenient and economical and is therefore preferred. Any means of incorporating the air in sufficient proportions with the liquor may be used, as for example a sufficiently intense mechanical stirring or beating of the liquor to which the barium carbonate has been added. Under these oxidizing conditions some decomposition (hydrolysis) of the organic sulfur compounds seems to occur, with precipitation of their sulfur as barium sulfate.

(3) The barium sulfate sludge is filtered or otherwise removed from the liquor, and is subsequently worked up for its barium contents as described below. The removal of this barium sludge at this stage is merely for the purpose of recovering its barium values, inasmuch as the presence of the insoluble barium salts would not interfere with the subsequent operations of fermentation and distillation.

(4) The filtered liquor is cooled in any suitable way, preferably to 27-28° C., the appropriate yeast-foods such as ammonium sulfate and phosphate are added, together with the separately prepared yeast, and the whole is stirred by a slow current of air for several hours. The fermentation should be complete in about fifty hours, or approximately one-half of the usual fermentation period with such liquors. The fermentation vats are covered, and the carbon dioxid evolved therefrom is collected and is used to recarbonate the barium salt in the recovery process.

(5) The distillation proceeds as usual, preferably in a still of the continuous type, the yeast being preferably previously removed from the liquor by filtration or centrifuging. An ordinary recovery of alcohol should approximate one per cent. of the weight of the liquor.

(6) The distillation residue or slop is treated with a soluble sulfate before being discharged into a stream, in order to insure the absence of the poisonous soluble barium compounds. For this purpose gypsum is sufficiently soluble, although other sulfates, including niter cake, salt cake, or sulfuric acid may be used. If the stream water is alkaline, no addition need be made, as the barium would then be precipitated as carbonate. Or if preferred, the slop from the still may be evaporated for fuel, or applied to any other appropriate purpose. In case the slop is used as fuel the ash may be worked for its barium sulfate content, or for its content of calcium and magnesium carbonate, or for both.

(7) The barium sulfate sludge obtained in step (3) above is mixed with coal (eighty per cent. barium sulfate and twenty per cent. coal on a dry basis) and is furnaced in a stationary or rotary kiln, whereby an impure barium sulfid or "black ash" is obtained.

(8) This impure barium sulfid or black ash is dissolved in hot water and the resulting solution filtered from the insoluble impurities.

(9) The hot solution obtained as above is now treated under some pressure with carbon dioxid, preferably that obtained from the fermentation vats. Thereby barium carbonate is precipitated and hydrogen sulfid is set free. The barium carbonate is filtered off and is applied to the treatment of the raw sulfite liquor as described in step (2) above. The hydrogen sulfid is piped off and burned, the resulting sulfur dioxid being led to the acid towers of the sulfite pulp mill and applied to the preparation of fresh cooking liquor. For the best results in this step of the process it is necessary that the solution should be quite hot, at least toward the end of the precipitation: heating to boiling with steam in the last stage of the process will insure the completeness of the precipitation and the expulsion of the last traces of hydrogen sulfid. It is preferred to apply the carbon dioxid under superatmospheric pressure, say about twenty pounds per square inch, for the double purpose of insuring a rapid precipitation of the barium carbonate, and of obtaining hydrogen sulfid of sufficient concentration to permit it to be burned with atmospheric air. If the carbon dioxid is not used under pressure the precipitation is slow, and the hydrogen sulfid is so diluted with the unabsorbed carbon dioxid that only the first portions from any given batch of material can be burned. The escape of the unburned gas is highly objectionable owing to its odor and poisonous character. The above procedure also possesses the advantages of yielding a distinctly granular precipitate, which is easily filtered and readily washed by decantation or otherwise.

(10) Instead of precipitating barium carbonate as described above from the clear solution of barium sulfid, the black ash from the kiln may be ground for example to pass a twenty-mesh screen, and then fed to the top of a mechanically stirred kiln along with water or steam, a current of carbon dioxid from the fermentation tanks being simultaneously passed through the kiln in the reverse direction. Thereby the barium sulfid is converted into an impure form of barium carbonate, which is directly utilizable in the process as a precipitant for the sulfur compounds, even though contaminated with the ash, unburned coal, and other impurities of the black ash.

(11) Instead of using and regenerating barium carbonate as above described, the precipitation of the sulfur compounds may be accomplished by means of other soluble barium salts or compounds used under oxidizing conditions, as for example barium sulfid, oxid, hydroxid, chlorid, etc. Thus barium sulfid may be applied under the essential conditions described above as applicable to the carbonate, and may be directly regenerated by furnacing the resulting barium sulfate sludge with carbon. In this case hydrogen sulfid is evolved during the precipitation, and may be burned in admixture with air to provide a supply of sulfur dioxid for the sulfite mill. The barium sulfid may be applied in the form of crude black ash, preferably ground to about sixty mesh, or it may be extracted from the ash by means of water and purified to any desirable extent before use.

The process as described above presents many advantages as compared for example with prior processes in which calcium carbonate is used for the treatment of the raw or blown liquor. Among such advantages are the following:—

(1) By the conjoint use of barium carbonate or barium sulfid and air the sulfur dioxid and the sulfites are removed rapidly and with substantial completeness. This statement applies also in large measure to other reducing materials present in the liquor and interfering with the yeast growth.

(2) The subsequent growth of the yeast is greatly stimulated by the saturation of the liquor with air. A solution containing sulfur dioxid and similar reducing bodies will rapidly consume its dissolved oxygen, after which the growth of the yeast will practically cease.

(3) Barium sulfate is so nearly insoluble (its solubility being only one two-thousandths that of calcium sulfate) that no scaling occurs in the still, or on the evaporator tubes in case evaporation is used. This overcomes one of the chief objections to the use of precipitants leading to the formation of calcium sulfate.

(4) Barium carbonate removes the sulfur of the compounds much more rapidly and completely than does calcium carbonate, owing perhaps in part to its more strongly basic character and in part to its higher solubility, barium carbonate being about twice as soluble in these liquors as calcium carbonate. In this connection reference may be made to an experiment in which two thousand gallon lots were treated under conditions as described above with one hundred fifty pounds respectively of barium carbonate and calcium carbonate. The barium carbonate was completely used up in three hours, while the calcium carbonate was changed to the extent of less than five per cent. in the same time. The liquor treated with barium carbonate was neutral in reaction and gave no sulfur dioxid upon distillation of the alcohol, whereas the liquor treated with calcium carbonate yielded much sulfur dioxid, with the result that it was necessary to redistil the alcohol after a chemical treatment for the removal of sulfur dioxid.

(5) The alcohol obtained in accordance with this process is quite pure, aside from the usual water-content, and requires no further treatment. It is utilizable for any purpose, and its field is not restricted to the preparation of denatured alcohol.

(6) The liquors as prepared for fermentation are quite free from calcium sulfite, which strongly inhibits the growth of yeast.

(7) The present process in its cyclical embodiment, permits the regeneration and recovery of the barium carbonate employed as the precipitant, with such mechanical losses as are practically unavoidable.

(8) The evaporation residues may be burned under ordinary boilers without injury to the boilers or their settings, since practically no sulfur dioxid or sulfur trioxid is set free. This is in distinction to the residue left on evaporation of raw liquors containing the so-called sulfo-lignate of calcium, the barium sulfo-lignate contained in the present liquors apparently not decomposing in this manner.

(9) The liquor after treatment and distillation is no longer injurious to fish in the water courses, it having been demonstrated that the complete removal of those materials which act as yeast-growth preventives, eliminates also the materials which act as fish poisons.

The elimination of sulfites from sulfite cellulose liquors by subjecting such liquors to the action of barium sulfid under oxidizing conditions, thereby producing barium sulfate and eliminating injurious sulfur compounds, is specifically claimed in my copending application Serial No. 213,372 filed January 23, 1918, as a division hereof.

I claim—

1. In a process of producing alcohol from sulfite-cellulose liquors, the step which consists in subjecting the liquor containing sulfites to the action of a soluble barium compound under oxidizing conditions, thereby producing barium sulfate and eliminating injurious sulfur compounds.

2. In a process of producing alcohol from sulfite-cellulose liquors, the step which consists in subjecting the liquor containing sulfites to aeration in presence of a soluble barium compound, thereby producing barium sulfate and eliminating injurious sulfur compounds.

3. In a process of producing alcohol from sulfite-cellulose liquors, the steps which consist in subjecting the liquor containing sulfites to the action of barium carbonate under oxidizing conditions, thereby producing a sludge containing barium sulfate, furnacing the barium sulfate under reducing conditions to form barium sulfid, and re-converting the sulfid into barium carbonate by the action of free carbon dioxid.

4. In a process of producing alcohol from sulfite-cellulose liquors, the steps which consist in subjecting the liquor containing sulfites to the action of barium carbonate under oxidizing conditions, thereby producing a sludge containing barium sulfate, furnacing the barium sulfate under reducing conditions to form barium sulfid, dissolving the sulfid, and re-converting the same into barium carbonate by the action of free carbon dioxid.

5. In a process of producing alcohol from sulfite-cellulose liquors, the steps which consist in subjecting the liquor containing sulfites to the action of barium carbonate under oxidizing conditions, thereby producing a sludge containing barium sulfate, furnacing the barium sulfate under reducing conditions to form barium sulfid, dissolving the sulfid, and re-converting the same into barium carbonate by the action of free carbon dioxid under superatmospheric pressure.

6. In a process of producing alcohol from sulfite-cellulose liquors, the steps which consist in subjecting the liquor containing sulfites to the action of barium carbonate under oxidizing conditions, thereby producing a sludge containing barium sulfate, furnacing the barium sulfate under reducing conditions to form barium sulfid, dissolving the sulfid, re-converting the same into barium carbonate by the action of free carbon dioxid under superatmospheric pressure, and burning the evolved hydrogen sulfid.

7. In a process of producing alcohol from sulfite-cellulose liquors, the steps which consist in subjecting the liquor containing sulfites to the action of barium carbonate under oxidizing conditions, thereby producing a sludge containing barium sulfate and a sulfite-free liquor, fermenting and distilling the liquor, and removing the residual barium salts from the distillery slop by treating the same with a soluble sulfate.

8. The hereindescribed method of producing barium carbonate and hydrogen sulfid, which consists in reacting upon a solution of barium sulfid with carbon dioxid under superatmospheric pressure.

9. The process of producing alcohol from sulfite-cellulose liquors, consists in purifying the liquor by the action of barium carbonate under dioxidizing conditions, thereby producing a sludge containing barium sulfate, separating said sludge, fermenting and distilling the purified liquor to obtain alcohol, furnacing the barium sulfate sludge under reducing conditions to form barium sulfid, and re-converting said sulfid into barium carbonate by treating the same with the carbon dioxid evolved from the fermentation vats.

10. The process of producing alcohol from sulfite-cellulose liquors, consisting in purifying the liquor by the action of barium carbonate under oxidizing conditions, thereby producing a sludge containing barium sulfate, separating said sludge, fermenting and distilling the purified liquor to obtain alcohol, furnacing the barium sulfate sludge under reducing conditions to form barium sulfid, and re-converting said sulfid into barium carbonate by treating the same under superatmospheric pressure with the carbon dioxid evolved from the fermentation vats.

In testimony whereof I affix my signature in presence of two witnesses.

RALPH H. McKEE.

Witnesses:
 HELEN MILLER NOYES,
 H. H. LUDWIG.

It is hereby certified that in Letters Patent No. 1,284,739, granted November 12, 1918, upon the application of Ralph H. McKee, of Ridgefield Park, New Jersey, for an improvement in "Processes of Treating Waste Sulfite-Cellulose Liquors," errors appear in the printed specification requiring correction as follows: Page 4, line 32, claim 9, for the word "consists" read *consisting;* same page and claim, line 34, for the word "dioxidizing" read *oxidizing;* and that the said Letters Patent should be read with these corrections therein that the same may conform to the record of the case in the Patent Office.

Signed and sealed this 24th day of December, A. D., 1918.

[SEAL.]

F. W. H. CLAY,
*Acting Commissioner of Patents.*

Cl. 252.